UNITED STATES PATENT OFFICE.

GEORGE KELLY, OF HINSDALE, ILLINOIS.

INSULATING MATERIAL AND METHOD OF MANUFACTURING THE SAME.

No. 844,140.　　　　Specification of Letters Patent.　　　Patented Feb. 12, 1907.

Application filed April 24, 1906. Serial No. 313,428.

*To all whom it may concern:*

Be it known that I, GEORGE KELLY, a citizen of the United States, residing at Hinsdale, in the county of Dupage and State of Illinois, have invented a new and useful Insulating Material and Method of Manufacturing Same, of which the following is a specification.

This invention relates to a method of manufacturing insulating material and the like, as well as the article produced by such method.

The principal object is to produce a highly-efficient insulating material from printed paper-stock, which can now be purchased as refuse at very small cost compared to the cost of unprinted paper of the same grade.

The invention is primarily based on the discovery that the inks employed in printing the papers contain ingredients which can be freed and made to coöperate as a binder and vulcanizing agent in cementing the paper-stock together and hardening the same to produce a highly efficient article.

In carrying out the invention the printed matter—such as newspapers, magazines, and the like—having printers' inks thereon are placed in an ordinary beating-engine, together with a vulcanizing liquid. This liquid is preferably composed of liquid glass, (silicate of sodium,) sulfur, and rubber. Ninety-five parts of silicate of sodium are employed with about five parts of flowers of sulfur and ten to fifteen parts of rubber. The various parts are measured by weight. These ingredients are first thoroughly intermixed in any well-known manner and are then placed in the beating-engine with the above-described paper-stock. The engine is then operated to thoroughly pulp the paper-stock and intermingle therewith the compound, whereupon the alkali of the liquid glass frees or liberates the ink and permits it to permeate the pulp. Inasmuch as printers' ink includes material that will act as a vulcanizing agent the same will combine with the rubber and sulfur. The mixed pulp is then removed from the engine, leaving the remaining liquid therein, and is placed upon screens and the surplus liquid allowed to drain back into the beater. The material is then permitted to partially dry or set, after which it is rolled or otherwise pressed into the desired forms. The articles thus produced are then placed in a vulcanizing-press and subjected to suitable vulcanizing heat. Instead of employing a pulping-engine the paper may be cut into strips, which are ground and mixed with the above-described liquor.

It is found that the product is a highly-efficient insulator that is both fire and moisture proof and is capable of withstanding high mechanical strain. Moreover, it is not frangible, and consequently can be advantageously used about dynamos and other electric machines driven at high speed, for the jar and vibration will not affect the same. It is, moreover, capable of a high polish. It will thus be seen that the waste product is made use of, and not only is the fiber of the paper employed, but the inks and colors are also an important item and are not wasted in the manufacture.

Having thus fully described my invention, what I claim as new, and desire to secure by Letters Patent, is—

1. That improvement in the process of manufacturing an insulating article, which consists in disintegrating printed material, mixing it with a liquid alkaline and vulcanizing solution, and afterward vulcanizing the same.

2. That improvement in the process of manufacturing an insulating article, which consists in disintegrating printed material, mixing with liquid glass and vulcanizing material, and afterward vulcanizing the same.

3. That improvement in the process of manufacturing an insulating article, which consists in pulping paper with a vulcanizing agent including rubber and liquid glass.

4. That improvement in the process of manufacturing an insulating article, which consists in pulping waste printed paper with a vulcanizing agent, including rubber dissolved in liquid glass, afterward removing the pulped and saturated material, pressing the same, and vulcanizing it under pressure and heat.

5. As an article of manufacture, a body comprising disintegrated material having printers' ink thereon mixed and vulcanized with a vulcanizing agent.

6. As an article of manufacture, a vulcanized body comprising printed material pulped in a compound that includes rubber and liquid glass.

7. As an article of manufacture, a vulcanized body comprising fibrous material pulped in a compound that includes rubber and liquid glass.

8. As an article of manufacture, a vulcanized body comprising disintegrated material having printers' ink thereon pulped in a compound including rubber and liquid glass.

In testimony that I claim the foregoing as my own I have hereto affixed my signature in the presence of two witnesses.

GEORGE KELLY.

Witnesses:
 JOHN H. SIGGERS,
 BLANCHE J. KALDENBACK.